(12) United States Patent
Nakamura et al.

(10) Patent No.: US 7,682,134 B2
(45) Date of Patent: Mar. 23, 2010

(54) FRANCIS PUMP-TURBINE

(75) Inventors: Kazuyuki Nakamura, Tokyo (JP); Kotaro Tezuka, Tokyo (JP); Toshifumi Kurokawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 625 days.

(21) Appl. No.: 11/545,760

(22) Filed: Oct. 11, 2006

(65) Prior Publication Data
US 2007/0140852 A1    Jun. 21, 2007

(30) Foreign Application Priority Data
Oct. 12, 2005 (JP) ............................. 2005-297423

(51) Int. Cl.
*B63H 1/16* (2006.01)
(52) U.S. Cl. .................. 416/185; 416/186 R; 416/188; 416/243
(58) Field of Classification Search ................. 416/185, 416/186 R, 188, 243, DIG. 2
See application file for complete search history.

(56) References Cited

U.S. PATENT DOCUMENTS

| | | | | |
|---|---|---|---|---|
| 1,509,653 A | * | 9/1924 | Kaplan | 416/248 |
| 2,042,064 A | * | 5/1936 | Kugel | 416/188 |
| 3,874,819 A | * | 4/1975 | Tamura et al. | 416/186 R |
| 6,135,716 A | * | 10/2000 | Billdal et al. | 416/183 |
| 2005/0042104 A1 | * | 2/2005 | Enomoto et al. | 416/179 |
| 2005/0089404 A1 | * | 4/2005 | Enomoto et al. | 416/186 R |

FOREIGN PATENT DOCUMENTS

JP    2000-136766 A    5/2000

* cited by examiner

*Primary Examiner*—Igor Kershteyn
(74) *Attorney, Agent, or Firm*—Foley & Lardner LLP

(57) ABSTRACT

A Francis pump-turbine includes a runner provided with runner blades arranged around in a circumferential direction of a main shaft of the runner, each of the runner blades being supported by a band at a bottom side thereof in a blade height direction and supported by a crown at a head side in the blade height direction, in which the runner blade is formed, at a trailing edge thereof, with a curved portion expanding to the main shaft when the turbine is in operation, the curved portion has a maximum point with respect to a straight line connecting a crown-side trailing edge connecting end at which the trailing edge and the crown are connected and a band-side trailing edge connecting end at which the trailing edge and the band are connected, and an angle α formed by a straight line connecting the maximum point and the crown-side trailing edge connecting end and a straight line connecting the maximum point and the band-side trailing edge connecting end is set to be within a range of $\alpha \leqq 150°$.

4 Claims, 8 Drawing Sheets

FRANCIS PUMP-TURBINE

BACKGROUND OF THE INVENTION

1. Field of the Invention

The present invention relates to Francis pump-turbines and, in particular, to a Francis pump-turbine capable of being operated at high-efficiency when the turbine is in a partial load operation.

2. Related Art

General Francis pump-turbines can freely select either a generating mode or a pump mode by switching the rotation of a motor generator from normal rotation to reverse rotation or vice versa.

FIG. 11 illustrates a general structure of a Francis pump-turbine, and as shown in FIG. 11, when the turbine generator is in operation, the Francis pump-turbine with this structure guides driving (operating) water, which is supplied from a high-level reservoir and a hydraulic pipe, both are not shown, to a spiral casing 1, to a runner 4 through a stay vane 2 and a guide vane 3 to rotate the runner 4, and supplies the power (running torque) generated at that time to a motor generator, not shown, via a main shaft (rotation shaft) 5.

While the pump is in operation, the Francis pump-turbine rotates the runner 4 in a direction reverse to that at the turbine generation by a driving force of the motor generator to guide the driving water from a draft tube 6 communicating with a lower reservoir to a runner chamber 7, where the driving water is given with energy from the runner 4 and pumped to the upper reservoir through the guide vane 3, the stay vane 2, and the casing 1.

The guide vane 3 opens or closes the vane according to fluctuations in electric power demand to control the flow rate of the driving water supplied from the casing 1 during the turbine generation.

The runner 4 has runner blades 8 mounted around the circumferential direction of the main shaft 5 at regular intervals, in which both ends in a height direction of the runner blade 8 is supported by a crown 9 and a band 10 to provide a flow channel between the runner blades 8.

FIG. 12 is a meridian view of the runner 4, extracted from part "A" of FIG. 11, where the meridian view is a developed view including the main shaft 5.

The trailing edge 11 of the runner blade 8, having both ends supported by the crown 9 and the band 10, has generally been constructed such that the radial position of the crown-side end 12 is set at about 50 percent of the radial position of the band-side end 13 from the main shaft 5 of the trailing edge 11.

In other words, the curved portion connecting the crown-side end 12 defined by the trailing edge 11 of the runner blade 8 and the crown 9 and the band-side end 13 defined by the trailing edge 11 and the band 10 bulges or expands out smoothly to the main shaft 5, wherein the relationship between a distance Rc from the main shaft 5 to the crown-side end 12 and a distance Rb from the main shaft 5 to the band-side end 13 has substantially been set to Rc=0.5 Rb.

As shown in FIG. 13, the runner 4 viewed from the outlet of the runner blade 8 (adjacent to the draft tube 6) has a structure in which the crown-side end 12 and the band-side end 13 of the trailing edge 11 of the runner blade 8 are connected with a straight line.

The crown-side ends 12 and the band-side ends 13 of all the trailing edges 11 have the same circumferential angle in the polar coordinates indicated by a radial distance from the main shaft 5 and a circumferential angle.

The runner 4 having the runner blades 8 of such a shape decreases significantly in runner efficiency if the flow rate goes out of a design point. For example, when the flow rate of the water falls below a design point, the driving water is affected by a centrifugal force to drift toward the band 10. When the flow rate of the water exceeds a design point, the water drifts toward the crown 9, causing a loss due to so-called secondary flow.

In order to reduce the loss due to the secondary flow to improve the partial load efficiency of the turbine, it has been proposed that the curved portion connecting the crown-side end 12 and the band-side end 13 of the trailing edge 11 of the runner blade 8 is changed from the position indicated by the broken line in a conventional structure to the position adjacent to the main shaft 5, indicated by the solid line, with which the flow line $ST_1$ indicated by the broken line is shifted to the flow line $ST_2$ indicated by the solid line to make the flow uniform. This method, however, has induced backflow to the runner blades 8 during the operation of the pump, extremely decreasing pump operation efficiency.

This leads to a need for tradeoff in designing hydraulic machinery in which not only the partial load efficiency of the turbine but also pump operation efficiency are improved.

A technique for improving the runner efficiency when the pump is in operation is disclosed in JP-A-2000-136766 (Patent Document 1), in which the leading edge of the runner blade is in form of a curve recessed in the rotating direction during the operation of the pump.

The Patent Document 1 discloses a pump-turbine runner having blades whose portions of leading edges (that is, trailing edges when the turbine is in operation) are in the form of curves recessed in the rotating direction during the operation of the pump. However, it provides no solution to the drift of the driving water when the turbine is in operation.

On the other hand, the technique proposed in FIG. 14 does not solve the problem of backflow induced when the pump is in operation even if the position of the trailing edge 11 indicated by the broken line in the conventional structure is shifted downstream to the position indicated by the solid line to make the flow line $ST_2$ uniform, thereby improving the partial load efficiency of the turbine. Therefore, the tradeoff is needed as well as in the Patent Document 1.

SUMMARY OF THE INVENTION

The invention was conceived in consideration of the circumstances mentioned above and an object of the present invention is to provide a Francis pump-turbine capable of preventing a backflow of a driving water during the operation of the pump and increasing a partial load efficiency during the operation of the turbine.

The above object can be achieved according to the present invention by providing, in one aspect, a Francis pump-turbine including a runner provided with runner blades arranged around in a circumferential direction of a main shaft of the runner, each of the runner blades being supported by a band at a bottom side thereof in a blade height direction and supported by a crown at a head side in the blade height direction, wherein the runner blade is formed, at a trailing edge thereof, with a curved portion expanding to the main shaft when the turbine is in operation, the curved portion has a maximum point with respect to a straight line connecting a crown-side trailing edge connecting end at which the trailing edge and the crown are connected and a band-side trailing edge connecting end at which the trailing edge and the band are connected, and an angle α formed by a straight line connecting the maximum point and the crown-side trailing edge connecting end and a straight line connecting the maximum point and the band-side trailing edge connecting end is set to be within a range of $\alpha \leqq 150°$.

In this aspect, both the curved portion formed to the trailing edge and the angle $\alpha$ are provided at a central portion of the runner blade from the trailing edge to an upstream side.

In another aspect of the present invention, there is also provided a Francis pump-turbine including a runner provided with runner blades arranged around in a circumferential direction of a main shaft of the runner, each of the runner blades being supported by a band at a bottom side thereof in a blade height direction and supported by a crown at a head side in the blade height direction, wherein the runner blade is formed, at a trailing edge thereof, with a curved portion expanding to the main shaft when the turbine is in operation, the curved portion has a maximum point with respect to a straight line connecting a crown-side trailing edge connecting end at which the trailing edge and the crown are connected and a band-side trailing edge connecting end at which the trailing edge and the band are connected, and a distance ratio S/Rb is set to be within a range of $S/Rb \geqq 0.05$ where S is a distance between the maximum point and the straight line connecting the crown-side trailing edge connecting end and the band-side trailing edge connecting end and Rb is a distance between the main shaft and the band-side trailing edge connecting end.

In a further aspect of the present invention, there is also provided a Francis pump-turbine including a runner provided with runner blades arranged around in a circumferential direction of a main shaft of the runner, each of the runner blades being supported by a band at a bottom side thereof in a blade height direction and supported by a crown at a head side in the blade height direction, wherein the runner blade has a pressure surface and a suction surface are formed to be curved inward, and a minimum thickness $t_o$ at a center in the blade height direction is set to be within a range of $t_o/\{(t_c+t_b)/2\} \leqq 0.90$ where $t_b$ is a thickness of the runner blade adjacent to the band and $t_c$ is a thickness of the runner blade adjacent to the crown.

In a further aspect of the present invention, there is also provided a Francis pump-turbine including a runner provided with runner blades arranged around in a circumferential direction of a main shaft of the runner, each of the runner blades being supported by a band at a bottom side thereof in a blade height direction and supported by a crown at a head side in the blade height direction, wherein the runner blade is formed with a linear suction surface and a pressure surface recessed inward, and a minimum thickness $t_o$ at a center in the blade height direction is set to be within a range of $t_{o1}/\{(t_{c1}+t_{b1})/2\} \leqq 0.85$ where $t_{b1}$ is a thickness of the runner blade adjacent to the band and $t_{c1}$ is a thickness of the runner blade adjacent to the crown.

In a further aspect of the present invention, there is also provided a Francis pump-turbine including a runner provided with runner blades arranged around in a circumferential direction of a main shaft of the runner, each of the runner blades being supported by a band at a bottom side thereof in a blade height direction and supported by a crown at a head side in the blade height direction, wherein the runner blade is formed with a curved portion at a central portion thereof from a trailing edge to an upstream side of the blade when the turbine is in operation, the curved portion has a maximum point with respect to a straight line connecting a crown-side blade connecting end and a band-side blade connecting end, an angle $\alpha$ formed by a straight line connecting the maximum point and the crown-side blade connecting end and a straight line connecting the maximum point and the band-side blade connecting end is set to be within a range of $\alpha \leqq 150°$, and a leading edge of the runner blade is formed in a straight line, the straight leading edge being connected from a crown-side leading edge connecting portion to a band-side leading edge connecting portion to the upstream side in a slanting direction.

In a still further aspect of the present invention, there is also provided a Francis pump-turbine including a runner provided with runner blades arranged around in a circumferential direction of a main shaft of the runner, each of the runner blades being supported by a band at a bottom side thereof in a blade height direction and supported by a crown at a head side in the blade height direction, wherein the trailing edge of the runner blade is constructed such that a trailing edge line of the runner blade connecting a crown-side trailing edge connecting end connecting a trailing edge and the crown and a band-side trailing edge connection end connecting the trailing edge and the band is retired to a reverse position with respect to a rotating direction of the main shaft during the operation of the turbine.

The Francis pump-turbine according to an embodiment of the present invention of the aspects mentioned above, the runner blade has the curved portion expanding to the main shaft (rotation shaft) at the trailing edge when the turbine is in operation and has a maximum point so as to make the flow rate of the water uniform and to increase the wet area. This arrangement can reduce energy loss during the partial load operation of the turbine and prevent the backflow of the driving water during the operation of the pump.

The nature and further characteristic features of the present invention will be made clearer from the following descriptions made with reference to the accompanying drawings.

DESCRIPTION OF THE PREFERRED EMBODIMENTS

A Francis pump-turbine according to an embodiment of the present invention will be described hereinafter with reference to the accompanying drawings.

Figure 11:
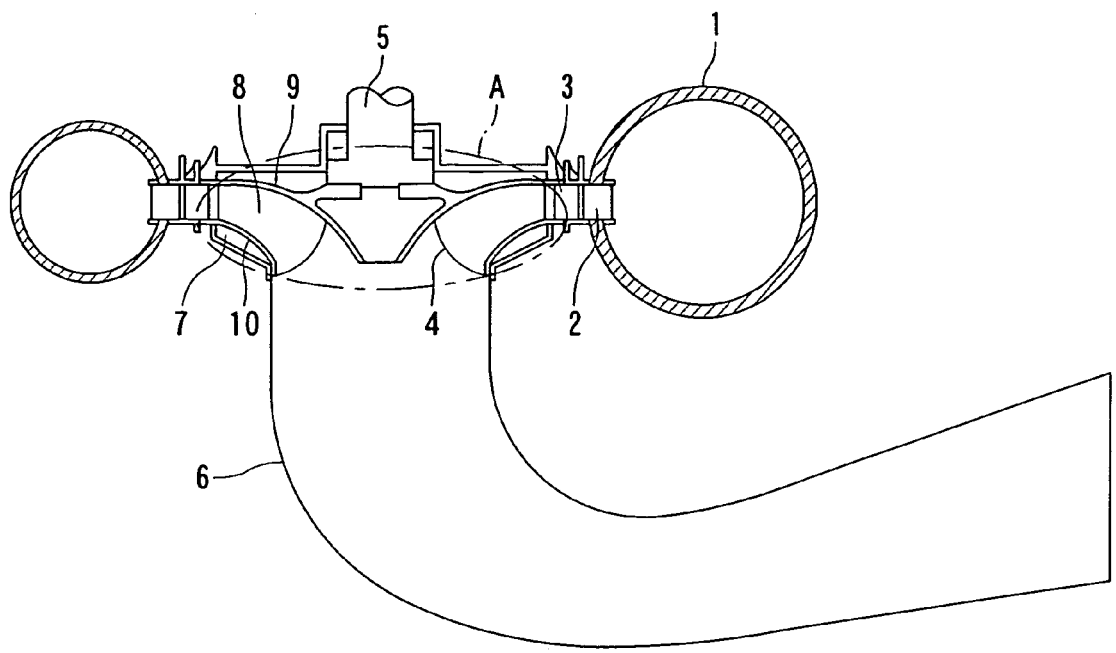
FIG. 11 is an illustrated conceptual diagram of a general Francis pump-turbine.
Figure 12:
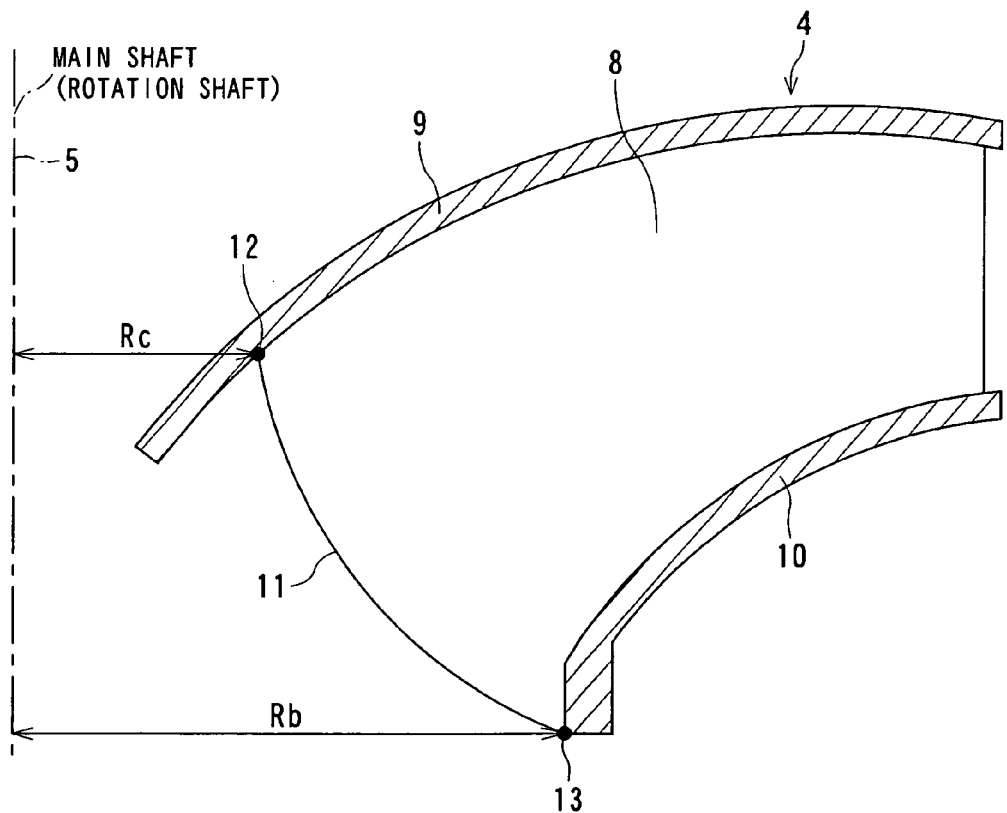
FIG. 12 is a conceptual diagram of a runner blade shown in FIG. 11.
Figure 13:
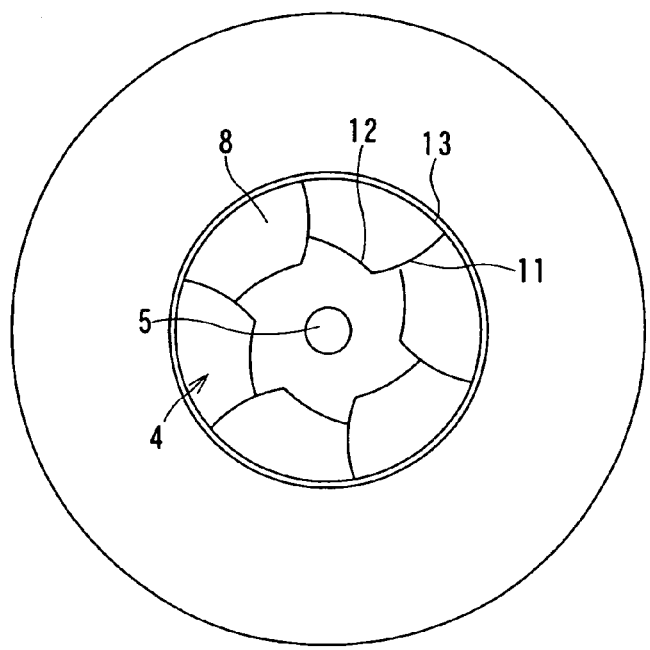
FIG. 13 is a conceptual diagram of the Francis pump-turbine in FIG. 11, as viewed from an outlet of a runner of the Francis pump-turbine shown in FIG. 11.
Figure 14:
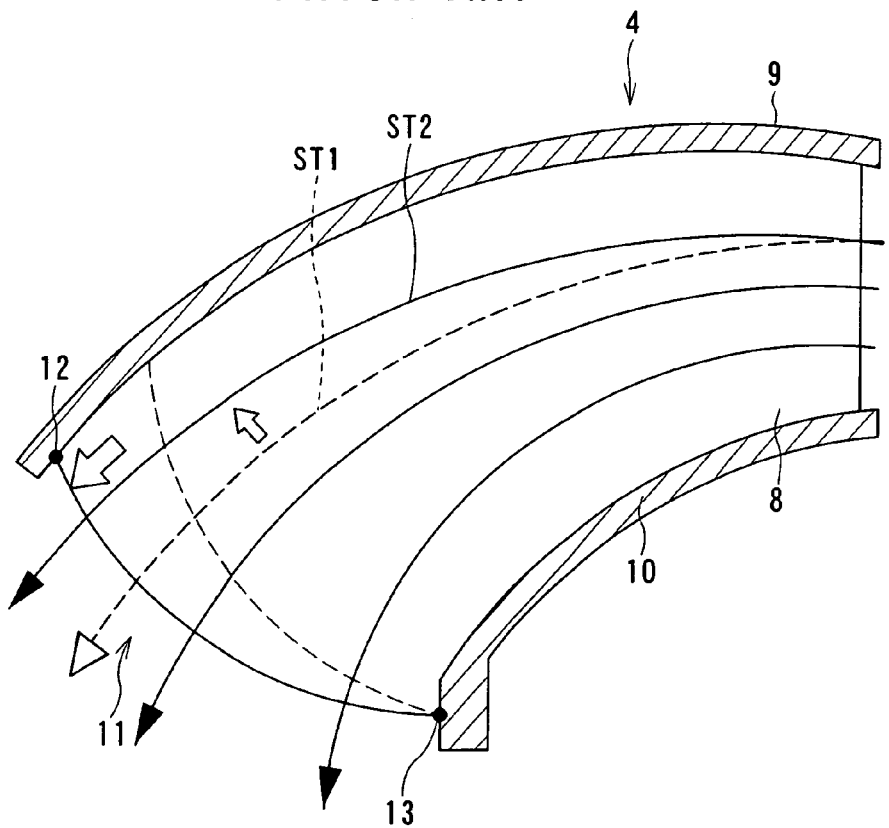
FIG. 14 is a diagram showing the behavior of flow lines of water in the runner blade of a conventional Francis pump-turbine when the turbine is in operation.

Further, it is first to be noted that the Francis pump-turbines according to each of the embodiments of the present invention has an entire basic structure similar, as an illustration, to that illustrated in FIG. 11, and accordingly, the embodiments of the present invention will be described hereunder with reference to the essential portions thereof for the present invention.

Figure 1:
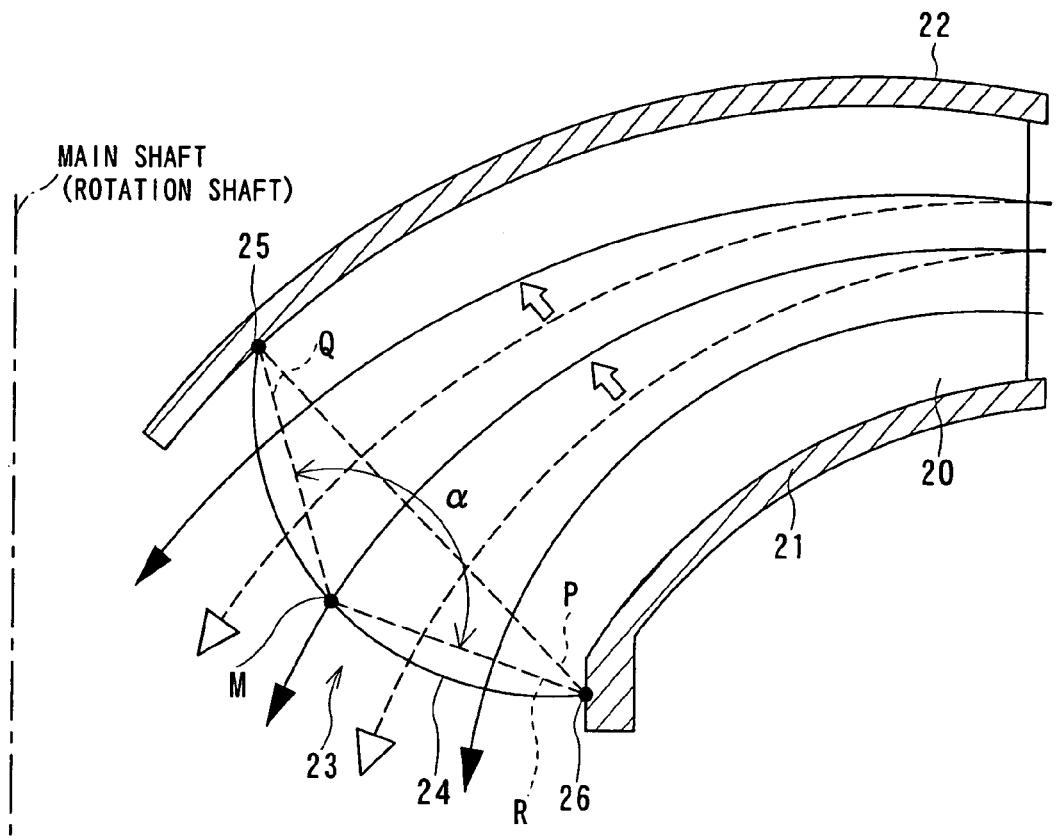
FIG. 1 is a conceptual diagram of a Francis pump-turbine according to a first embodiment of the present invention.

FIG. 1 shows an essential portion of a Francis pump-turbine according to a first embodiment of the invention.

The Francis pump-turbine according to this first embodiment is constructed such that a trailing edge 23 of each of runner blades 20 bulges out toward a main shaft (i.e., rotational shaft) so as to form a curved portion 24 when the turbine is in operation (on the other hand, when the pump is in operation, a leading edge bulges), the runner blade 20 being supported at its bottom side by a band 21 in a blade height direction and supported at the head by a crown 22. The curved portion 24 has a maximum point M with respect to a straight line P connecting a crown-side trailing edge connecting end 25 at which the trailing edge 23 and the crown 22 are connected and a band-side trailing edge connecting end 26 at which the trailing edge 23 and the band 21 are connected, and the curved portion 24 also has an angle α formed by a straight line Q connecting the maximum point M and the crown-side trailing edge connecting end 25 and a straight line R connecting the maximum point M and the band-side trailing edge connecting end 26, the angle being set to be within a range of $\alpha \leqq 150°$.

Figure 2:
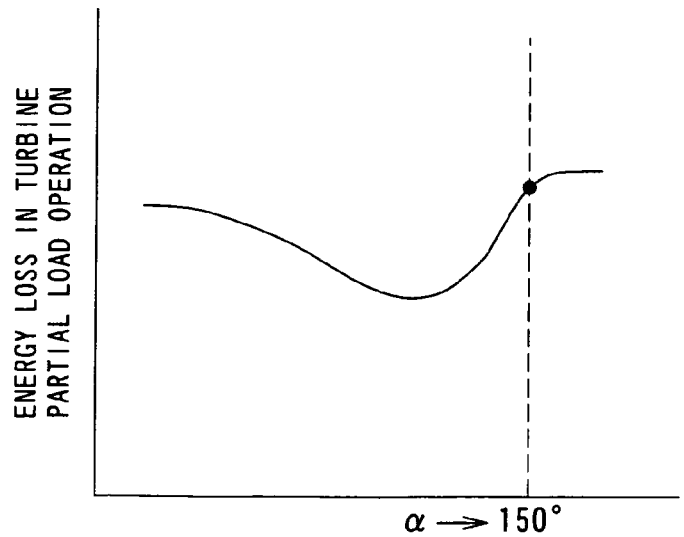
FIG. 2 is a graph of energy loss of the Francis pump-turbine shown in FIG. 1 when the turbine is in partial load operation.

FIG. 2 is a graph showing an energy loss obtained by experiment, which shows a relationship between the energy loss when the turbine is in partial load operation and the angle formed by the straight line Q connecting the crown-side trailing edge connecting end 25 and the maximum point M and the straight line R connecting the band-side trailing edge connecting end 26 and the maximum point M.

As can be seen in FIG. 2, with the angle α formed by the straight line Q and the straight line R, the energy loss is made less in the range of $\alpha \leqq 150°$.

This may be due to the structure of the embodiment in which the trailing edge 23 has the curved portion 24 expanding to the main shaft, the curved portion 24 has the maximum point M, and the angle a formed by the straight line Q and the straight line R passing through the maximum point M is set within $\alpha \leqq 150°$. This prevents the flow lines of the driving water, indicated by the broken lines of FIG. 1, from approaching the band 21 when the turbine is in partial load operation with a flow rate smaller than a design point, so as to shift the flow lines to those indicated by the solid lines owing to the effect of reducing centrifugal force, thereby making uniform the flow-rate distribution of the water from the trailing edge 23.

When the pump is in operation, the water at the leading edges of the runner blades 20 (on the other hand, the trailing edges 23 during the operation of the turbine) is reduced in pressure difference between the pressure surface and a suction surface, thereby preventing backflow from causing.

According to the structures mentioned above, the energy loss during the partial load operation of the turbine can be reduced, and the backflow of the driving water during the operation of the pump can be prevented from causing.

Further, in this embodiment, only the trailing edge 23 of the runner blade 20 has the curved portion 24 expanding to the main shaft, the curved portion 24 has the maximum point M, and the angle α formed by the straight line Q connecting the maximum point M and the crown-side trailing edge connecting end 25 and the straight line R connecting the maximum point M and the band-side trailing edge connecting end 26 is set to be within the range of $\alpha \leqq 150°$. However, the invention is not limited to such arrangement or construction, and other changes may be adopted.

Figure 3:
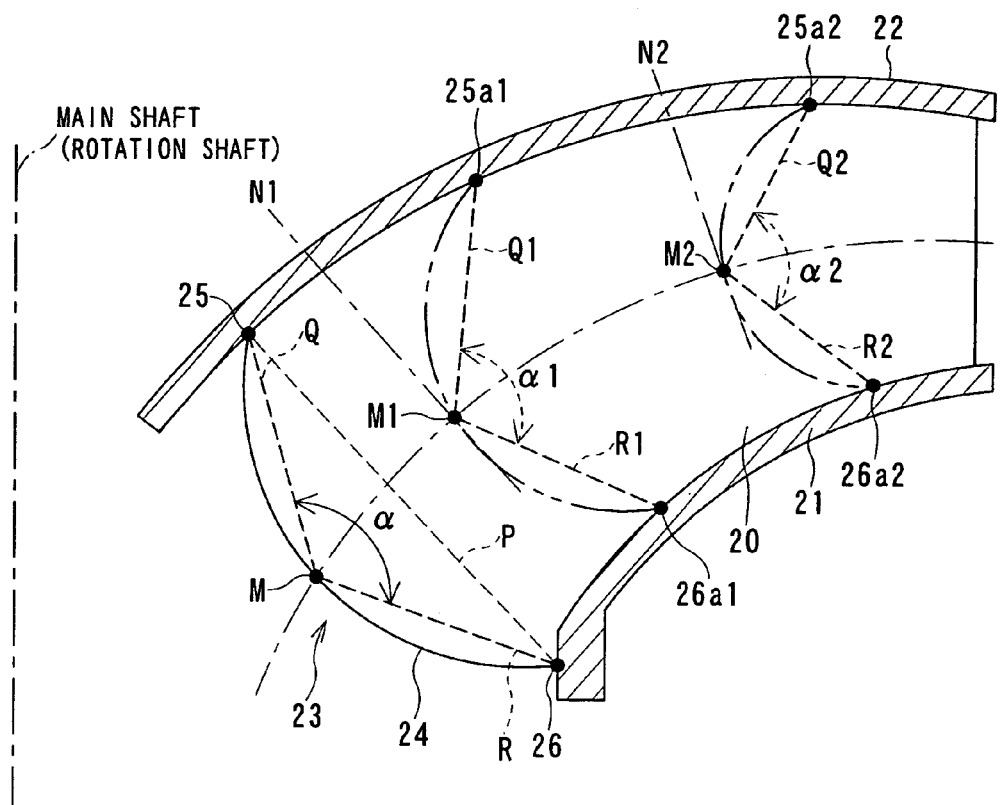
FIG. 3 is a conceptual diagram of a Francis pump-turbine according to a second embodiment of the present invention.

For example, as shown in FIG. 3, it may be possible to form maximum points $M_1$, $M_2$, - - - at centers $N_1$, $N_2$, - - - of the runner blade 20 from the trailing edge 23 of the runner blade 20 (on the other hand, the leading edge when the pump is in operation) to the upstream side of the driving water when the turbine is in operation, and angles $\alpha_1$, $\alpha_2$, - - - that are formed by straight lines $Q_1$, $Q_2$, - - - connecting the maximum points $M_1$, $M_2$, - - - and crown-side blade connecting ends $25_{a1}$, $25_{a2}$, - - - , respectively, and straight-lines $R_1$, $R_2$, - - - connecting the maximum points $M_1$, $M_2$, - - - and band-side blade connecting ends $26_{a1}$, $26_{a2}$, - - - , respectively, may be set to be within the range of $\alpha_1$, $\alpha_2$, - - - $\leqq 150°$.

Figure 4:
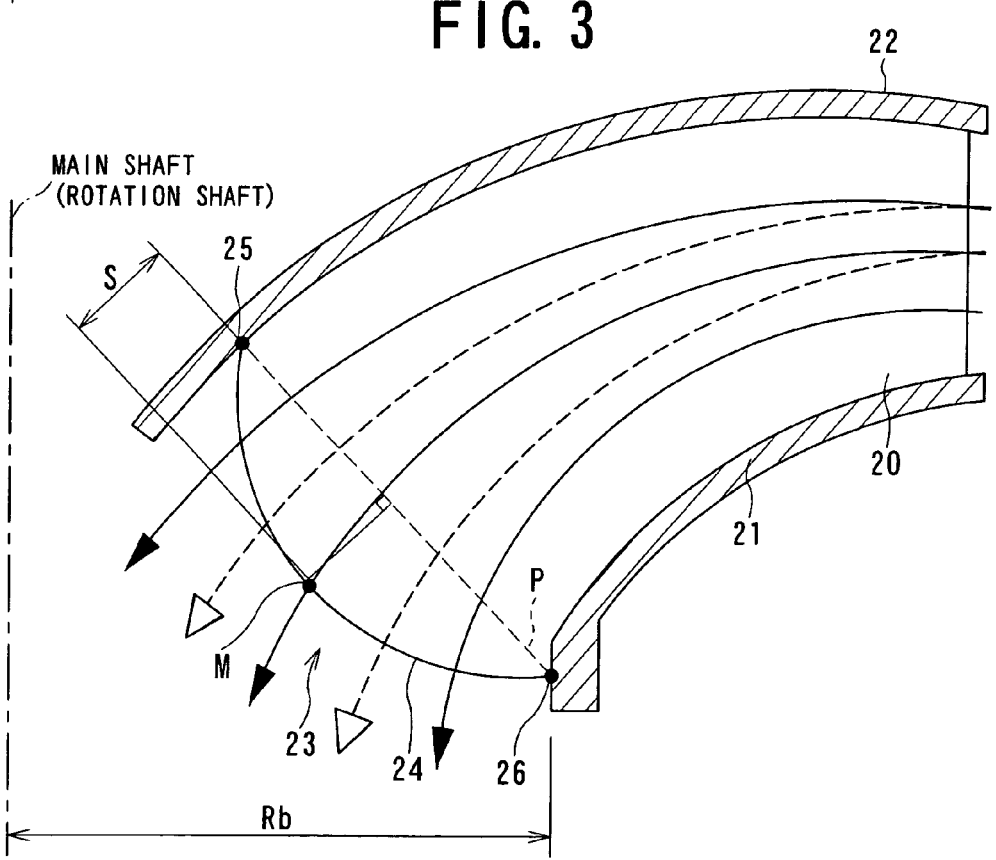
FIG. 4 is a conceptual diagram of a Francis pump-turbine according to a third embodiment of the present invention.

FIG. 4 is a conceptual diagram of an essential portion of a Francis pump-turbine according to a third embodiment of the invention.

The Francis pump-turbine according to this third embodiment is constructed such that the trailing edge 23 of each runner blade 20 when the turbine is in operation (while, the leading edge when the pump is in operation) bulges out toward the main shaft to form the curved portion 24, the runner blade 20 being supported at its bottom portion by the band 21 in the blade height direction and supported at the head by the crown 22. The curved portion 24 has a maximum point M, and a distance ratio S/Rb is set to be within the range of $S/Rb \geqq 0.05$, where S is a distance between the maximum point M and the straight line P connecting the crown-side trailing edge connecting end 25 and the band-side trailing edge connecting end 26, and Rb is a distance between the main shaft and the band-side trailing edge connecting end 26.

Figure 5:
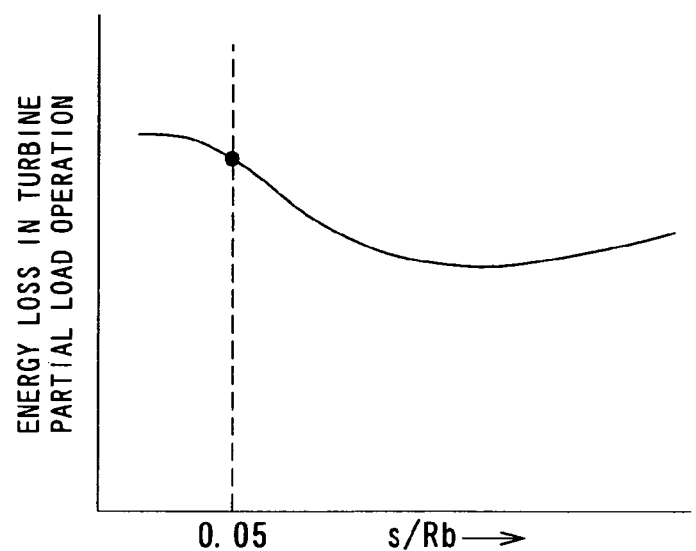
FIG. 5 is a graph of energy loss of the Francis pump-turbine shown in FIG. 4 when the turbine is in partial load operation.

FIG. 5 is a graph of energy loss obtained by experiment, which shows the relationship between the energy loss at the time when the turbine is in partial load operation and the distance ratio S/Rb.

With reference to FIG. 5, it will be found that the energy loss is made small at the distance ratio $S/Rb \geqq 0.05$.

This is due to the structure of the embodiment in which the trailing edge 23 has the curved portion 24 expanding to the main shaft, the curved portion 24 has the maximum point M, and the ratio S/Rb of the distance S between the maximum point M and the straight line P connecting the crown-side trailing edge connecting end 25 and the band-side trailing edge connecting end 26 to the distance Rb between the main shaft and the band-side trailing edge connecting end 26 is set to be within the range of $S/Rb \geqq 0.05$ so as to increase the area that gets wet by the water, thereby preventing the flow lines of the water, indicated by the broken lines in FIG. 3, from approaching the band 21, while the turbine is in partial load operation with a flow rate smaller than a design point, so as to shift them to the flow lines indicated by the solid lines owing to the effect of reducing centrifugal force, thereby making uniform the flow-rate distribution of the driving water from the trailing edge 23.

When the pump is in operation, the driving water at the leading edges of the runner blades 20 (on the other hand, the trailing edges 23 during the operation of the turbine) is reduced in pressure difference between the pressure surface and suction surface surfaces owing to the larger wet area of the leading edges, thereby preventing backflow.

Thus, according to the arrangement of this embodiment, the energy loss can be reduced during the partial load operation of the turbine, and the backflow of the water during the operation of the pump can be prevented from causing.

Figure 6:
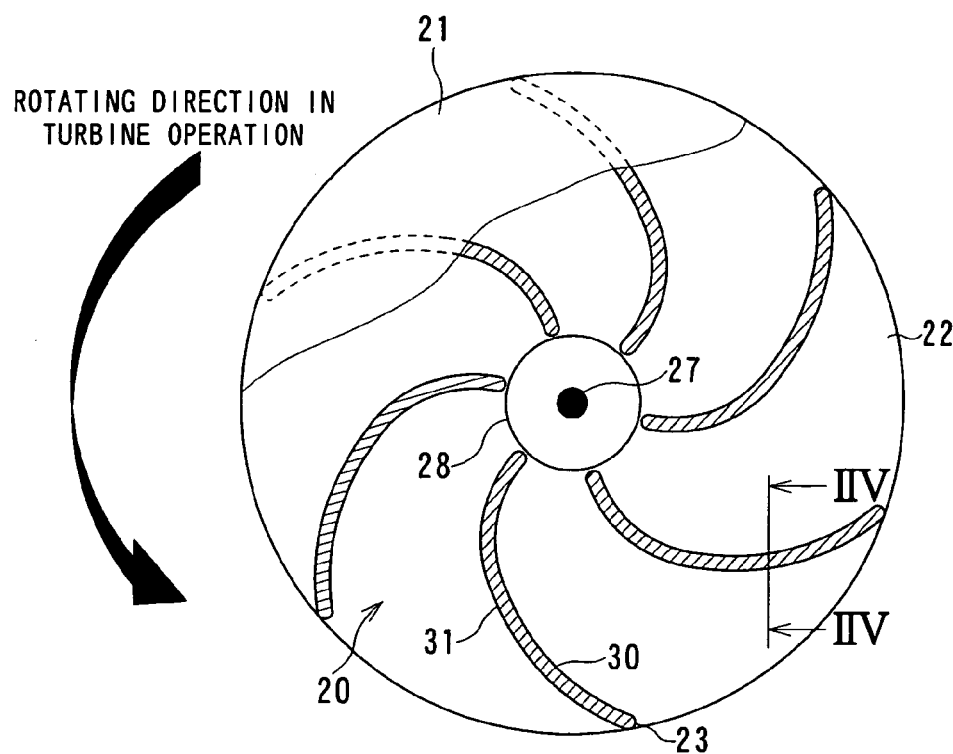
FIG. 6 is a sectional view of the main shaft of a Francis pump-turbine according to a fourth embodiment of the present invention, as viewed from an outlet of a runner.
Figure 7:
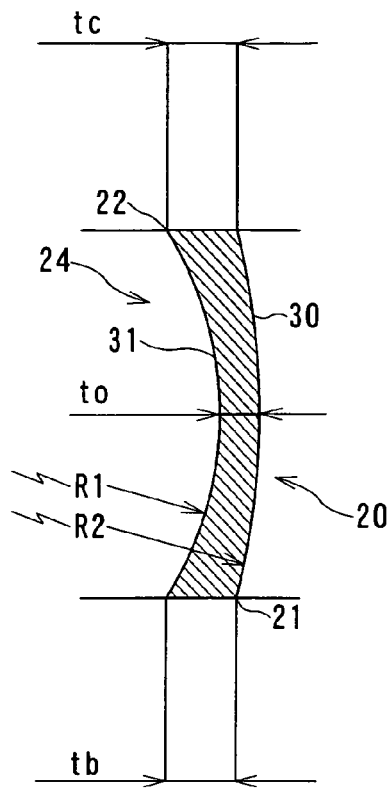
FIG. 7 is a sectional view taken along line IIV-IIV of FIG. 6.

FIGS. 6 and 7 are conceptual diagrams of a Francis pump-turbine according to a fourth embodiment of the invention.

With reference to FIG. 6, the Francis pump-turbine according to this fourth embodiment has runner blades 20 supported by the band 21 and crown 22 and arranged along the circumferential direction of a main shaft (rotation shaft) 27, each having a leading edge (on the other hand, a trailing edge when the pump is in operation) 28 on the inner diameter side and having a trailing edge (on the other hand, a leading edge when the pump is in operation) 29 on the outer diameter side.

Referring to FIG. 7, in which the curvature radius $R_1$ of a pressure surface 31 is set to be smaller than the curvature radius $R_2$ of a suction surface 30, and there is set a minimum thickness of the runner blade 20 at a central portion in the height direction of the runner blade forming the curved portion 24.

That is, as shown in FIG. 7, the minimum thickness to at the center in the height direction of the runner blade 20 is set to be within a range of $t_o/\{(t_c+t_b)/2\} \leq 0.90$, where $t_b$ is the thickness of the runner blade 20 adjacent to the band 21 and $t_c$ is the thickness of the runner blade 20 adjacent to the crown 22. The expression for the minimum thickness to is obtained by experiment.

Thus, in this embodiment, the minimum thickness $t_o$ at the blade center in the height direction thereof, in which the curvature radius $R_1$ of the pressure surface 31 is set to be smaller than the curvature radius $R_2$ of the suction surface 30, is set to be within a range of $t_o/\{(t_c+t_b)/2\} \leq 0.90$.

This arrangement makes it possible to cope with the driving water with a material of weight lower than the conventional material, thus improving cost performance.

Figure 8:
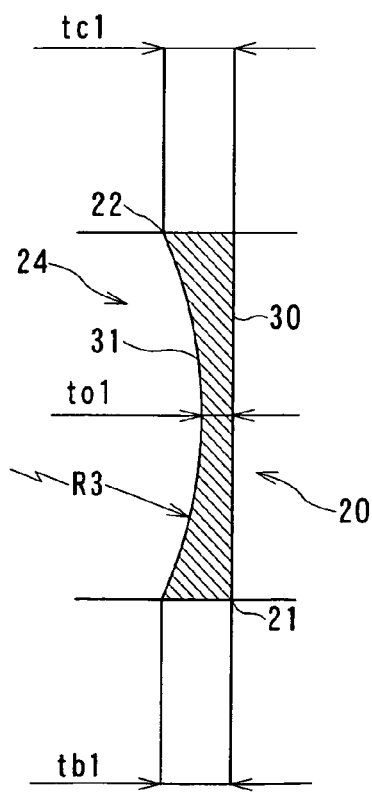
FIG. 8 is a conceptual diagram of a Francis pump-turbine according to a fifth embodiment of the present invention.

In this embodiment, the minimum thickness $t_o$ is applied to the runner blade 20 in the range of $R_2>R_1$ where $R_2$ is the curvature radius of the suction surface 30 and $R_1$ is the curvature radius of the pressure surface 31. However, the present invention is not limited to this embodiment, and other modifications may be adopted. For example, as shown in FIG. 8, when the inwardly recessed pressure surface 31 of the curved portion 24 has a curvature radius $R_3$ and the suction surface 30 is in a straight line, the minimum thickness $t_{o1}$ at the center of the blade height direction is written as the following expression of $t_{o1}/\{(t_{c1}+t_{b1})/2\} \leq 0.85$, where $t_{b1}$ is the thickness of the runner blade 20 adjacent to the band 21 and $t_{c1}$ is the thickness of the runner blade 20 adjacent to the crown 22. The expression for the minimum thickness $t_{o1}$ is obtained by experiment.

Thus, according to the arrangement mentioned above of this embodiment, the driving water was coped with a material of weight lower than that of conventional material, thus improving cost performance.

Figure 9:
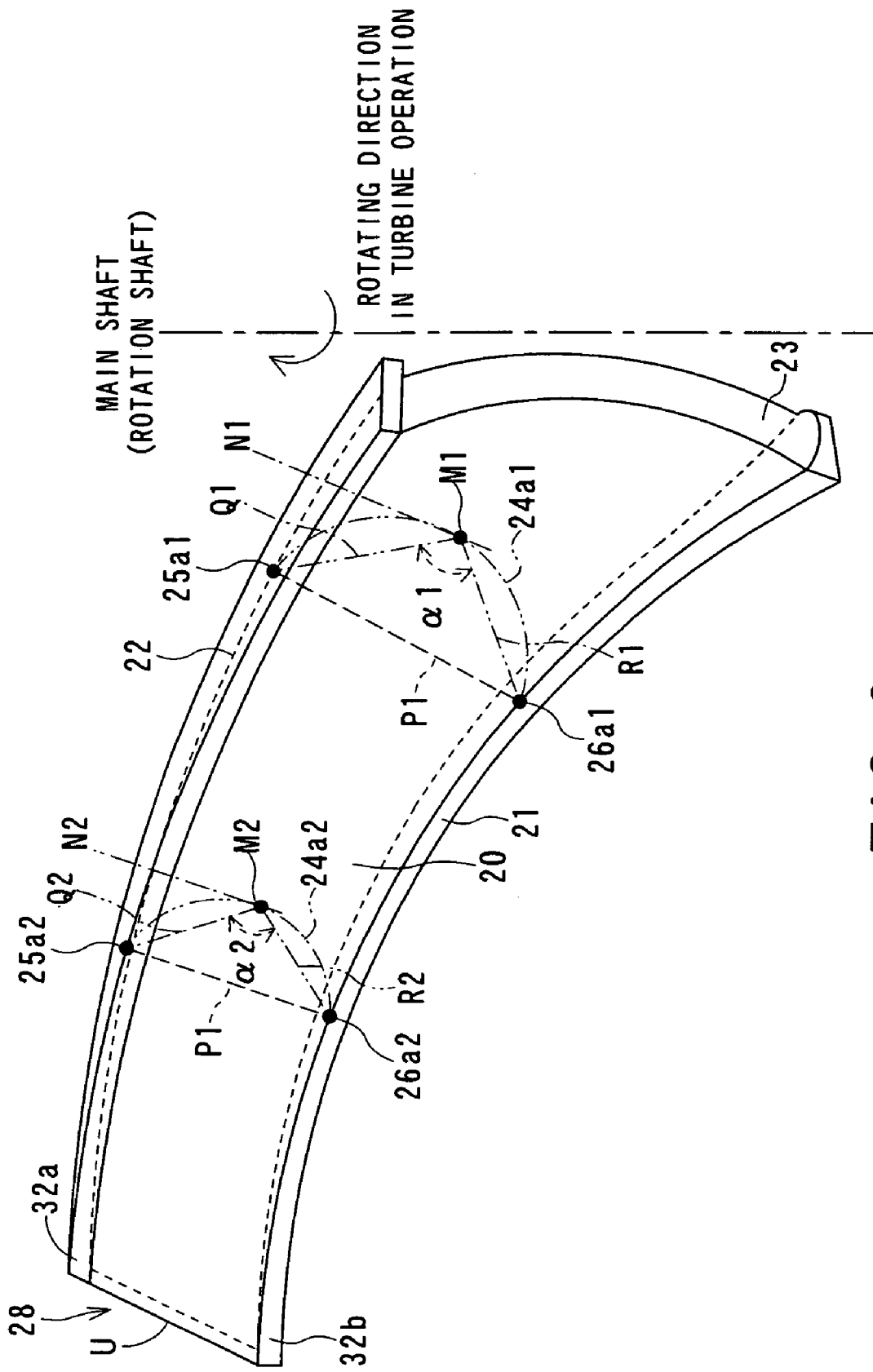
FIG. 9 is a conceptual diagram of a runner blade of a Francis pump-turbine according to a sixth embodiment of the present invention.

FIG. 9 is a diagram of a runner blade of a Francis pump-turbine according to a sixth embodiment of the present invention.

This embodiment is constructed such that the runner blade 20 has curved portions $24_{a1}$, $24_{a2}$, - - - at centers $N_1$, $N_2$, - - - of the runner blade 20 from the trailing edge (on the other hand, the leading edge when the pump is in operation) 23 of the runner blade 20 to the upper stream of the driving water when the turbine is in operation, the curved portions $24_{a1}$, $24_{a2}$, - - - have the maximum points $M_1$, $M_2$, - - - for the straight lines $P_1$, $P_2$, - - - connecting the crown-side blade connecting ends $25_{a1}$, $25_{a2}$, - - - and the band-side blade connecting ends $26_{a1}$, $26_{a2}$, - - - , respectively, angles $\alpha_1$, $\alpha_2$, - - - that are formed by the straight lines $Q_1$, $Q_2$, - - - connecting the maximum points $M_1$, $M_2$, - - - and the crown-side blade connecting ends $25_{a1}$, $25_{a2}$, - - - and the straight lines $R_1$, $R_2$, - - - connecting the maximum points $M_1$, $M_2$, - - - and band-side blade connecting ends $26_{a1}$, $26_{a2}$, - - -, respectively, are set to be within the range of $\alpha_1$, $\alpha_2$, - - - $\leq 150°$ and the leading edge 28 of the runner blade 20 when the turbine in operation is formed in a straight line U, the straight line U being inclined from a crown-side leading edge connecting end 32a to the upstream side into connection with a band-side leading edge connecting end 32b.

Thus, according to the arrangement of this embodiment mentioned above, in order to provide a wide wet area of the runner blade 20 adjacent to the band 21 and to increase the rectifying effect, the energy loss can be reduced during the partial load operation of the turbine, and the backflow of the driving water during the operation of the pump can be prevented from causing.

Figure 10:
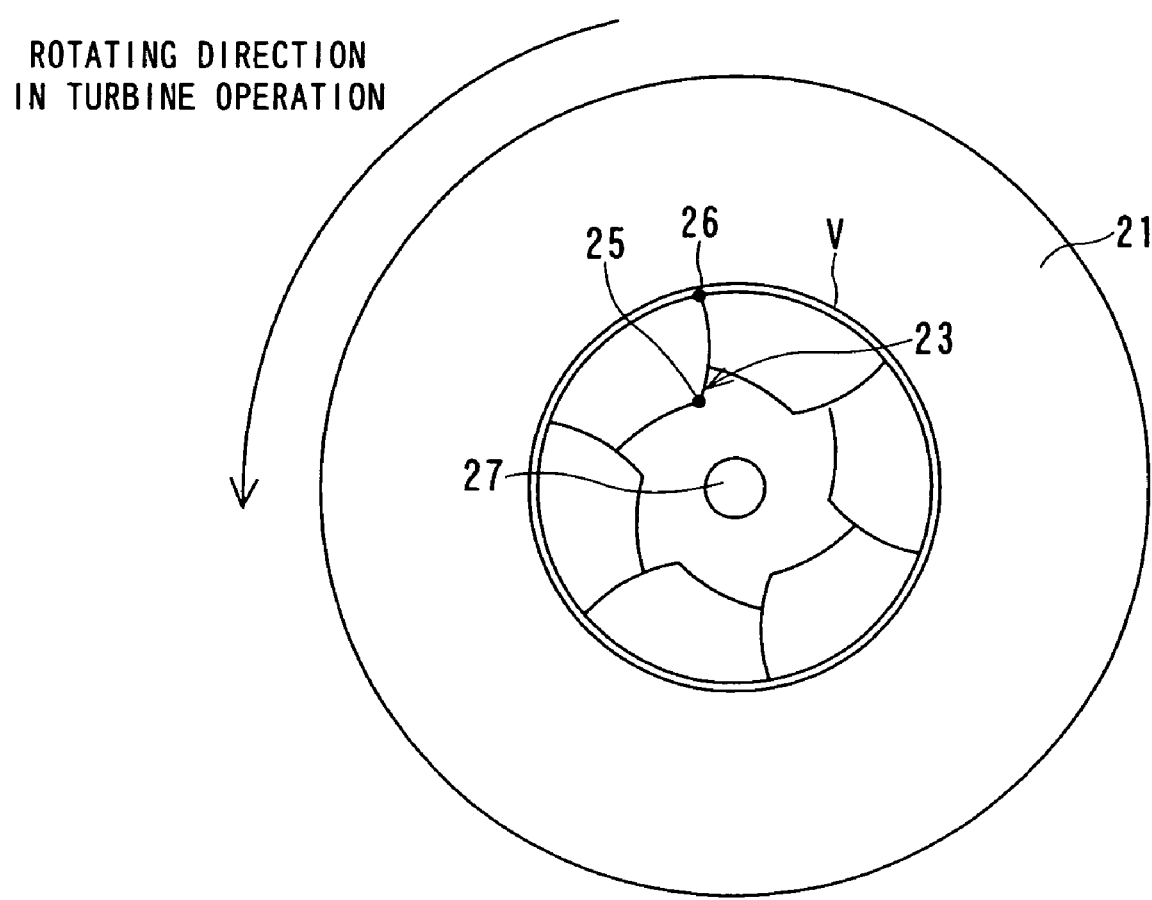
FIG. 10 is a conceptual diagram of a Francis pump-turbine according to a seventh embodiment of the present invention.

FIG. 10 is a conceptual diagram of a Francis pump-turbine according to a seventh embodiment of the present invention.

FIG. 10 is a sectional view seen from the outlet (draft tube) of the runner during the operation of the turbine.

In this embodiment, a trailing edge line V connecting the crown-side trailing edge connecting end 25 and the band-side blade 20 when the turbine is in operation is constructed such that trailing edge connecting end 26 of the trailing edge 23 of the runner the band-side trailing edge connecting end 26 is retired to a reverse directional position more than the crown-side trailing edge connecting end 25 with respect to the rotating direction of the main shaft 27. In this case, the trailing edge line V may either be a straight line or a curved portion expanding to a direction reverse to the rotating direction of the turbine.

Thus, according to this embodiment, the wet area of the runner blade adjacent to the band 21 is increased, thereby making uniform the flow-rate distribution of the driving water. This arrangement can therefore reduce the energy loss during the partial load operation of the turbine and prevent the backflow of the water during the operation of the pump.

This application claims priority from Japanese Patent Application 2005-297423, filedOct. 12, 2005 which is incorporated herein by reference in their entirety.

What is claimed is:

1. A Francis pump-turbine comprising:
   a runner provided with runner blades arranged around in a circumferential direction of a main shaft of the runner, each of the runner blades being supported by a band at a bottom side thereof in a blade height direction and supported by a crown at a head side in the blade height direction,
   wherein each of the runner blades is formed, at a trailing edge thereof, with a curved portion expanding to the main shaft when the turbine is in operation,
   wherein the curved portion has a maximum point with respect to a straight line connecting a crown-side trailing edge connecting end at which the trailing edge and the crown are connected and a band-side trailing edge connecting end at which the trailing edge and the band are connected, and
   wherein an angle α formed by a straight line connecting the maximum point and the crown-side trailing edge connecting end and a straight line connecting the maximum point and the band-side trailing edge connecting end is set to be within a range of $\alpha \leqq 150°$.

2. The Francis pump-turbine according to claim 1, wherein both the curved portion formed to the trailing edge and the angle $\alpha$ are provided at a central portion of the runner blade from the trailing edge to an upstream side.

3. A Francis pump-turbine comprising:

a runner provided with runner blades arranged around in a circumferential direction of a main shaft of the runner, each of the runner blades being supported by a band at a bottom side thereof in a blade height direction and supported by a crown at a head side in the blade height direction, wherein each of the runner blades is formed, at a trailing edge thereof, with a curved portion expanding to the main shaft when the turbine is in operation, wherein the curved portion has a maximum point with respect to a straight line connecting a crown-side trailing edge connecting end at which the trailing edge and the crown are connected and a band-side trailing edge connecting end at which the trailing edge and the band are connected, wherein a distance ratio S/Rb is set to be within a range of S/Rb$\geqq$0.05 where S is a distance between the maximum point and the straight line connecting the crown-side trailing edge connecting end and the band-side trailing edge connecting end and Rb is a distance between the main shaft and the band-side trailing edge connecting end, and wherein an angle $\alpha$ formed by a straight line connecting the maximum point and the crown-side trailing edge connecting end and a straight line connecting the maximum point and the band-side trailing edge connecting end is set to be within a range of $\alpha \leqq 150°$.

4. A Francis pump-turbine comprising:

a runner provided with runner blades arranged around in a circumferential direction of a main shaft of the runner, each of the runner blades being supported by a band at a bottom side thereof in a blade height direction and supported by a crown at a head side in the blade height direction, wherein each of the runner blades is formed with a curved portion at a central portion thereof from a trailing edge to an upstream side of the blade when the turbine is in operation, wherein the curved portion has a maximum point with respect to a straight line connecting a crown-side blade connecting end and a band-side blade connecting end, wherein an angle $\alpha$ formed by a straight line connecting the maximum point and the crown-side blade connecting end and a straight line connecting the maximum point and the band-side blade connecting end is set to be within a range of $\alpha \leqq 150°$, and wherein a leading edge of the runner blade is formed in a straight line, the straight leading edge being connected from a crown-side leading edge connecting portion to a band-side leading edge connecting portion to the upstream side in a slanting direction.

* * * * *